United States Patent Office 3,565,800
Patented Feb. 23, 1971

3,565,800
IONIC COMPOSITIONS CONTAINING Hg(II), Zn(II), Cd(II), Ag(I), Cu(II), Ni(II) AND/OR Co(II), AND A POLYMER OF AN ETHYLENE IMINE
Robert C. Wade, Ipswich, Mass., assignor to Ventron Corporation, Beverly, Mass., a corporation of Massachusetts
No Drawing. Filed Feb. 4, 1969, Ser. No. 796,612
Int. Cl. C07f 15/06; C23b 5/30
U.S. Cl. 252—1
18 Claims

ABSTRACT OF THE DISCLOSURE

The invention provides an ionic composition which is a solution of an oxide or hydroxide of a metal selected from Hg(II), Zn(II), Cd(II), Ag(I), Cu(II), Ni(II), Co(II) and mixtures thereof in an aqueous solution of a polymer of ethylene imine haivng a molecular weight between about 600 and 100,000 and in which the nitrogen atoms are separated by not more than two carbon atoms and the primary, secondary and tertiary imine nitrogen ratio is about 1 to 2 to 1 respectively. The composition is sufficiently ionic so that the contained metal, (1) can be electroplated therefrom onto other metals without adding an alkaline material, or (2) displaced therefrom by metals higher in the electromotive series. The composition also may be used to coat various anionic substrates, such as cotton, glass, leather, paper and starch.

SPECIFICATION

This invention relates to aqueous ionic metal-containing compositions which are useful for electroplating the contained metal onto other metals and for coating various anionic substrates, such as cotton, glass, leather, paper and starch.

The invention is based upon the discovery that the oxides and hydroxides of certain metals, which normally are water insoluble, may be dissolved in an aqueous solution of polymers of ethylene imine having a molecular weight between about 600 and 100,000 and in which the nitrogen atoms are separated by not more than two carbon atoms and the primary, secondary and tertiary imine nitrogen ratio is about 1 to 2 to 1 respectively. These polymers are manufactured by the Dow Chemical Company and sold under the trademark "PEI." The oxides and hydroxides which I have found operative are those of the metals Hg(II), Zn(II), Cd(II), Ag(I), Cu(II), Ni(II), Co(II) and mixtures thereof.

I have further discovered that the solutions formed by dissolving the above mentioned metal oxides or metal hydroxides in the above mentioned polymers of ethylene imine are sufficiently ionic so that the contained metal may be electroplated onto various usbstrates, such as copper, brass, iron, etc., without adding an alkaline material to the solution, or may be displaced from the solution by metals higher in the electromotive series and platings or amalgams can be made by dipping metals, such as copper or aluminum into the solutions. Furthermore, various anionic substrates, such as cotton, glass, leather, paper and starch, can be coated with these ionic solutions to bond firmly the metal to the substrate to form a desired coating thereon when dried, such as a bacteriocidal coating.

In preparing the ionic solutions of the invention, the metal oxide or hydroxide is dispersed in the liquid polymer to provide a dispersion containing between about 3 to 10 parts by weight of polymer to 1 part of metal oxide or hydroxide. Then, a desired amount of water is added slowly with stirring until the metal oxide or hydroxide is dissolved. In some cases, the mixture may be heated to about 60° C. to assist solution. The amount of water used will vary with the metal oxide or hydroxide used and the desired final concentration. An amount of water between about 10 ml. to 100 ml. per gram of metal oxide or hydroxide is usually suitable.

The inevntion is illustarted by the following specific examples:

EXAMPLE 1

1 gram of red oxide of mercury (HgO) was dispersed in 3 grams of the polymer (PEI-6) having a molecular weight of about 600. Then 10 ml. of distilled water was added. The red oxide dissolved rapidly and completely to give a water white solution. The solution thus formed is sufficiently ionic so that mercury can be electroplated from this solution on to various substrates, such as copper, brass and iron (although the latter is not appreciably wet by the mercury). Likewise, mercury can be displaced from this solution by metals higher in the electromotive series and plating or amalgams can be made by dipping metals, such as copper or aluminum, into this solution.

Similarly, water soluble solutions were made from HgO with polyethylene imines where the molecular weight was as high as 100,000. Various anionic substrates, such as cotton, glass, leather, paper and starch, can be coated with these ionic solutions to bond firmly the mercury to the substrate and render a bacteriocidal coating on the substrate.

EXAMPLE 2

1 gram of cupric oxide (CuO) was dispersed in 10 grams of the polymer having a molecular weight of about 600. The copper oxide slowly but completely dissolved to give a deep blue solution. Copper was easily electroplated from solution on many metals including steel and aluminum. Displacement plating of metals more active than copper in the electromotive series also occurred.

I gram of cuprous oxide was dispersed into 10 grams of anhydrous polymer having a molecular weight of 600. Water was added. Almost no solution of the $Cu_2O$ occurred. However, at the air-water interface a faint blue color was observed indicating that $Cu_2O$ was being oxidized and dissolving. A few drops of $H_2O_2$ were cautiously added to the solution. The $Cu_2O$ was rapidly oxidized and dissolved completely to give a deep blue clear solution. Thus, only the cupric [Cu(II)] form will form these solutions.

EXAMPLE 3

One gram of zinc oxide was dispersed in 10 grams of the polymer having a molecular weight of 600. No solution occurred. As water was added to bring the total volume to 100 ml., all the zinc oxide dissolved to give a water white solution. Zinc was electroplated from this solution onto steel and copper showing that this solution is also ionic.

EXAMPLE 4

1 gram of cadmium oxide was dispersed in 10 grams of anhydrous polymer having a molecular weight of 600 and water was slowly added to bring the total volume to 100 ml. The suspension was warmed to 60° C. on a hot plate. The cadmium oxide dissolved over a period of 45 minutes. Excellent electroplatings were made from this solution onto various metal samples including steel and copper.

EXAMPLE 5

9.6 grams of silver oxide was dispersed in 19.4 grams of polymer having a molecular weight of 600. Water was added to bring the volume to 830 ml. Most of the solids dissolved rapidly but a small amount of undissolved solids remained which were analyzed and found to be metallic silver. This clear solution was allowed to stand in a clear glass bottle for a few days. A perfect mirror coating of silver developed on the surface of the bottle. Some of the solution was placed in a test tube and exposed to sunlight. A mirror coating quickly developed on the walls of the test tube.

Silver was easily electroplated from this solution onto iron, copper and aluminum. Displacement plating of metals more active than silver also occurred.

Anonic substrates, such as cellulose, were coated with this solution and dried. The substrate had excellent bacteriocidal properties.

EXAMPLE 6

1 gram of nickel oxide was dispersed in 10 grams of polymer having a molecular weight of 600. No reaction or solution was noted. Water was added to bring the total volume to 100 ml. The suspension was warmed on a hot plate for several hours. A violet solution slowly formed.

20 grams of $NiCl_2 \cdot 4H_2O$ dissolved in 200 ml. of water was treated with 8 grams of NaOH dissolved in 50 ml. of water to precipitate $Ni(OH)_2$. This precipitate was filtered and washed free of chloride ions. The $Ni(OH)_2$, still wet with water, was transferred to a beaker containing 25 grams of polymer having a molecular weight of 600 and the total volume brought to 1 liter with water. The $Ni(OH)_2$ dissolved completely to give a clear violet solution after about 1 hour of stirring.

Nickel was electroplated from these solutions on steel and copper cathodes.

EXAMPLE 7

0.1 mole of $CoCl_2 \cdot 6H_2O$ was dissolved in 200 ml. of water. To this was added 8 g. of NaOH dissolved in 50 ml. of water. The pricipitated $Co(OH)_2$ was filtered and washed free of $Cl^-$ ion. Then this precipitate was added to a beaker containing 30 g. of PEI-6. After thoroughly dispersing, water was added slowly with stirring to bring the total volume to 1 liter. A deep violet colored solution slowly formed. Cobalt could be electroplated from this solution.

I claim:

1. An ionic composition consisting essentially of a solution of a metal compound selected from the group consisting of oxides and hydroxides of a metal selected from the group consisting of Hg(II), Zn(II), Cd(II), Ag(I), Cu(II), Ni(II), Co(II) and mixtures thereof in an aqueous solution of a polymer of ethylene imine having a molecular weight between about 600 and about 100,000 and in which the nitrogen atoms are separated by not more than two carbon atoms and the primary, secondary and tertiary imine nitrogen ratio is about 1 to 2 to 1 respectively.

2. An anionic substrate coated with the composition as claimed by claim 1 after drying.

3. The composition as claimed by claim 1 wherein the selected metal is Hg(II).

4. An anionic substrate coated with the composition as claimed by claim 3 after drying.

5. The composition as claimed by claim 1 wherein the selected metal is Zn(II).

6. An anionic substrate coated with the composition as claimed by claim 5 after drying.

7. The composition as claimed by claim 1 wherein the selected metal is Cd(II).

8. An anionic substrate coated with the composition as claimed by claim 7 after drying.

9. The composition as claimed by claim 1 wherein the selected metal is Ag(I).

10. An anionic substrate coated with the composition as claimed by claim 9 after drying.

11. The composition as claimed by claim 1 wherein the selected metal is Cu(II).

12. An anionic substrate coated with the composition as claimed by claim 11 after drying.

13. The method of forming an aqueous metal-containing ionic complex which consists essentially of dissolving a metal compound selected from the group consisting of oxides and hydroxides of a metal selected from the group consisting of Hg(II), Zn(II), Cd(II), Ag(I), Cu(II), Ni(II), Co(II), and mixtures thereof in an aqueous solution of a polymer of ethylene imine having a molecular weight between about 600 and 100,000 and in which the nitrogen atoms are separated by not more than two carbon atoms and the primary, secondary and tertiary imine nitrogen ratio is about 1 to 2 to 1 respectively.

14. The method as claimed by claim 13 wherein the selected metal is Hg(II).

15. The method as claimed by claim 13 wherein the selected metal is Zn(II).

16. The method as claimed by claim 13 wherein the selected metal is Cd(II).

17. The method as claimed by claim 13 wherein the selected metal is Ag(I).

18. The method as claimed by claim 13 wherein the selected metal is Cu(II).

References Cited

UNITED STATES PATENTS

| 3,282,851 | 11/1966 | Muehlberg et al. | 260—2X |
| 3,318,870 | 5/1967 | Teumac | 260—438.1X |
| 3,329,512 | 7/1967 | Shipley et al. | 117—130X |
| 3,346,527 | 10/1967 | Lagally | 260—2X |
| 3,393,135 | 7/1968 | Rosenberg | 204—55 |
| 3,403,035 | 9/1968 | Schneble et al. | 117—130X |
| 3,458,542 | 7/1969 | Moore et al. | 260—430X |

FOREIGN PATENTS

| 1,232,800 | 1/1967 | Germany | 204—55 |

JOHN T. GOOLKASIAN, Primary Examiner

J. C. GIL, Assistant Examiner

U.S. Cl. X.R.

117—123, 130, 142, 155, 160, 227; 204—46, 48, 49, 50, 52, 55; 252—518; 260—429, 429.9, 430, 431, 438.1, 439